United States Patent [19]

Cribbs

[11] Patent Number: 4,754,279

[45] Date of Patent: Jun. 28, 1988

[54] SCAN CONVERTER FOR RADAR

[75] Inventor: Robert W. Cribbs, Placerville, Calif.

[73] Assignee: Folsom Research, Inc., Folsom, Calif.

[21] Appl. No.: 893,290

[22] Filed: Aug. 4, 1986

[51] Int. Cl.$^4$ .............................................. G01S 7/04
[52] U.S. Cl. ..................................... 342/185; 358/140
[58] Field of Search .......................... 342/185; 358/140

[56] References Cited

U.S. PATENT DOCUMENTS 4,568,941 2/1986 Thomas et al. ...................... 342/185

Primary Examiner—Thomas H. Tarcza
Assistant Examiner—Mark Hellner
Attorney, Agent, or Firm—Weissenberger & Peterson

[57] ABSTRACT

In a scan converter for converting polar-coordinate radar data into a standard video display scanned at a 100 ns per pixel rate, the reading of sixteen x-y pixels into the video buffer, writing of two polar pixels into the x-y memory, and fading of four x-y pixels in the x-y memory can all be accomplished in a single 1600 ns time slot by using a nibble mode of addressing with an x-y memory made up of four standard 64K chips operable in parallel. In another aspect of the invention, radar data can be written into the x-y memory of a scan converter at double that rate without affecting the read or fade capabilities by configuring the x-y memory chips in such a manner that a given address on the memory chips represents a group of adjacent pixels of one line of the display and a corresponding group of pixels of the next adjacent line of the display.

5 Claims, 2 Drawing Sheets

SCAN CONVERTER FOR RADAR

FIELD OF THE INVENTION

This invention relates to radar scan converters, and particularly to a scan converter which combines fast writing of radar data with continuous fade to provide high resolution.

BACKGROUND OF THE INVENTION

Radar scan converters typically translate the polar coordinates of data received by the radar set into the corresponding rectangular coordinates so that the data can be stored in an x-y memory. The x-y memory can then be scanned linearly to produce a video display.

In a standard video display of 525 lines by 512 pixels scanned at 30 frames per second, one pixel must be written each 100 ns. If the image is contained in a 512-line field of the display, and 64K memory chips are used for the x-y memory, four memory chips are required to store the entire 512×512 pixel image. The four memories are read out in parallel every 400 ns on the average, and the four pixels derived from the read-out are transferred to a buffer memory which is read onto the display screen by the video scan.

In the conventional memory configuration, the four 64K memory chips represent four adjacent pixels of the same video line. Consequently, four pixels can be read out of the x-y memory in parallel during each video read operation.

Each operational cycle of a radar scan converter must perform four functions: (1) read pixels stored in the x-y memory into the video buffer; (2) read corresponding pixels out of the radar buffer, and x-y memory, compare them, and write new pixel data into the x-y memory at the same location if appropriate; (3) generate the addresses for the read and write operations; and (4) if continuous fade (for tracking moving targets) is used, read, decrement, and rewrite selected pixels in the x-y memory.

In the standard hardware package for this type of application, the generation of a full random address coupled with a read or write operation requires about 200 ns. Subsequent read or write operations at the same location require only 100 ns.

It follows that in conventional scan converters, the reading of sixteen pixels out of the x-y memory in parallel groups of four consumes 800 ns. Inasmuch as the video monitor takes 1600 ns to scan sixteen pixels, 800 ns are available in conventional scan converters for the other functions described above.

A radar data read/modify/write operation consumes 300 ns, as the read and write operations take place at the same address. Likewise, a fade read/modify/write operation on four parallel pixels consumes 300 ns for the same reason. Thus, in the remaining 800 ns of a 1600 ns cycle, it is possible to do either two radar data writes and no fade, or one radar data write and one four-pixel fade.

In order to maintain the above-described functions within the time limits dictated by the video scan, it has thus previously been necessary either to perform the fade function in separate cycles, e.g. during the video retrace, or to reduce the rate at which radar data is written into the x-y memory, or to use more complex and expensive hardware.

Although the conventional system works well in conventional radars, modern high-resolution radars require even faster updating of radar data as well as smooth fades. With the conventional memory configuration, this entails even more hardware complexity and expense.

SUMMARY OF THE INVENTION

The present invention, in one of its aspects, allows a fade operation to be combined with two radar data write operations in a single 1600 ns operational cycle by using a nibble mode of addressing the x-y memory during the video read operation. This mode reduces the time for reading sixteen pixels into the video buffer from 800 ns to 500 ns, thereby leaving time for an additional read/modify/write operation.

In another aspect, the invention makes it possible to write radar data into the x-y memory twice as fast without substantial additional hardware by simply changing the configuration of the x-y memory. Specifically, in accordance with the invention, the four memory chips are made to represent two adjacent pixels of the same line plus the two pixels directly below them on the next line.

With this arrangement, it becomes possible to reduce the cycle time to 800 ns while still writing two pixels of radar data into the x-y memory, and in addition performing a fade on two pixels, during each cycle. This is so because with the inventive memory configuration, any radar vector, regardless of its direction, will always intersect two pixels which are not on the same chip. Therefore, a single radar data read/write operation can always write two pixels simultaneously.

DESCRIPTION OF THE PREFERRED EMBODIMENT

Figure 1:
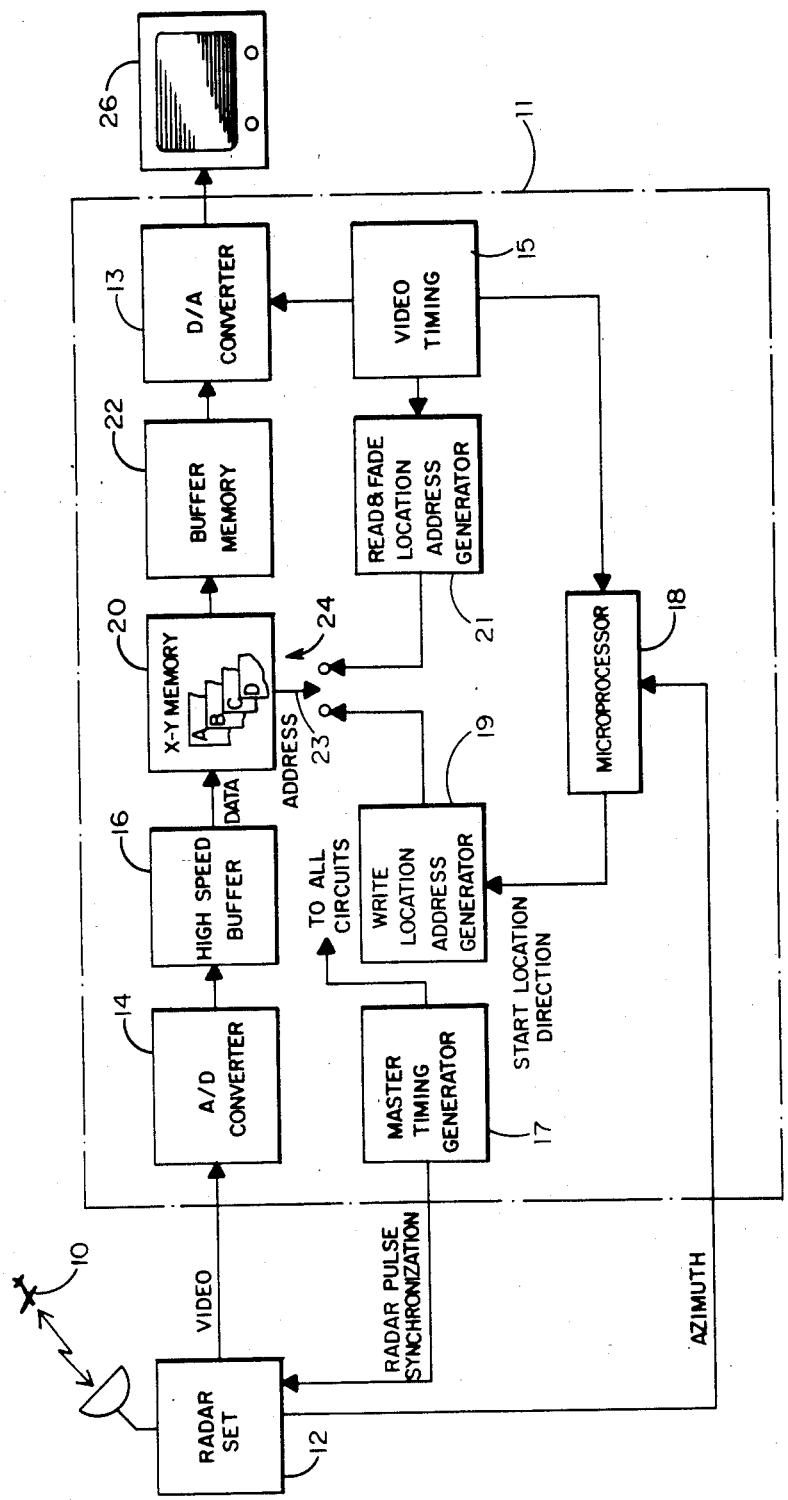
FIG. 1 is a block diagram of a radar system using the invention.

FIG. 1 shows the environment in which the present invention is used. An echo from a target 10 is picked up by the radar set 12 and is translated into radar data whose polar coordinates are distance and bearing. In the scan converter 11, the analog polar-coordinate data for each bearing is converted into digital form by an analog-to-digital converter 14 and temporarily stored in a high-speed buffer memory 16.

In order to display the image on a standard rectangularly scanned video screen 26, the polar pixels of the radar data in the buffer memory 16 are transferred into the corresponding rectangular coordinate location of an x-y memory 20 under the direction of a microprocessor 18. The x-y memory 20 contains the entire radar image in rectangular coordinate form. From the x-y memory 20, data is read out linearly into a buffer memory 22 whose contents are reconverted into analog form by digital-to-analog converter 13 and used to control the intensity of the video scan from pixel to pixel. The timing for the D/A converter 13 and the video monitor 26 is provided by the video timing circuit 15 of scan converter 11.

A master timing generator 17 provides synchronized timing for all the internal circuits of scan converter 11, and also provides to the radar set 12 the pulse synchronization for the radar pulses whose echoes are being recorded.

The microprocessor 18 receives information regarding the azimuth of the radar antenna from the radar set 12. Based on this information, the microprocessor 18 causes the write location address generator 19 to generate, for each write radar data operation, the x-y memory address at which the radar pixel involved in that operation is to be written. The video timing circuit causes the read and fade location address generator 21 to generate, for each read video data and fade operation, the appropriate x-y address at which the elements of that operation are to be performed. An electronic switch 23 selects address generator 19 or 21 as the address input to the x-y memory 20 in accordance with the operation being performed. Video timing is supplied to the microprocessor 18 for retrace synchronization purposes.

The present invention concerns the configuration of the x-y memory 20 and the recording and fading of radar data in that memory. The invention will best be understood by comparing its structure and operation with that of a conventional scan concerter memory.

Figure 2:
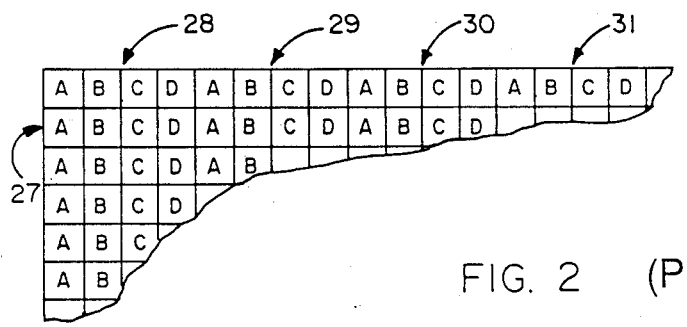
FIG. 2 is a graphical representation illustrating the conventional configuration of the scan converter memory.

A frame of a standard video image is conventionally stored in a memory 20 consisting of four 64K (65,536 bit) memory chips 24 for each image plane. As shown in FIG. 2, if the four memory chips are denoted A, B, C, and D, groups of four consecutive pixels in each line of the video display 26 are stored at the same location on chips A, B, C and D, respectively.

Figure 3:
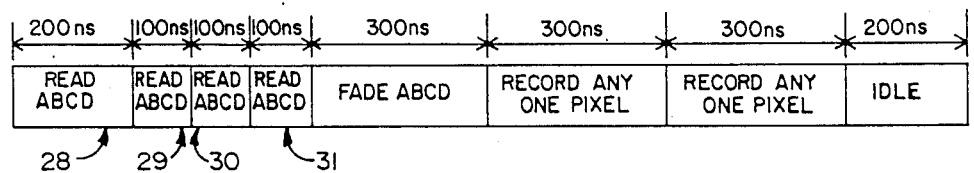
FIG. 3 is a graphical representation illustrating a nibble-addressed operational cycle used with the memory configuration of FIG. 2 to provide continuous fade.

In accordance with one aspect of this invention, the recording, reading and fading of data in memory is accomplished by the operational cycle shown in FIG. 3. The operational cycle of FIG. 3 is typically 1600 ns long (i.e. the time required to scan sixteen pixels of the video screen). During the first 200 ns of the cycle, a first location 28 (FIG. 2) on chips A through D is addressed, and the contents of the chips at that location are read into the buffer memory 22.

Because the next location 29 in chips A through D is immediately adjacent the location 28, it is possible to move from location 28 to location 29 without generating a new address, as the memory chips 24 can clock themselves internally from one location to the next in a so-called nibble mode. As a result, the location 29 can be read in only 100 ns instead of the 200 ns required for a randomly accessed location. The read is then repeated twice more at the next two adjacent locations 30, 31 so that a total of sixteen pixels are read into buffer memory 22 in 500 ns during each operational cycle.

During the next 300 ns, a read/modify/write cycle is performed in parallel on four adjacent pixels to decrement the intensity values of those pixels by one intensity level. This causes the gradual fading of the displayed targets so that the path of a moving target can be readily observed on the video screen.

The next following 300 ns of the operational cycle of FIG. 3 are devoted to writing a single pixel from buffer memory 16 into the appropriate location in x-y memory 20 as determined by write location address generator 19. A second pixel of radar data is then written into x-y memory 20 in the same manner in the next 300 ns. No time can be saved even if the two radar pixels are adjacent to one another because the corresponding x-y pixel location must be randomly accessed each time. The two pixels cannot be transferred simultaneously or in a nibble mode, as (depending on the azimuth) they may require writing into the same chip at two different locations such as 27 and 29 (FIG. 2).

The last 200 ns of the 1600 ns operational cycle of FIG. 3 are not needed for any operations.

It will be seen that the cycle of FIG. 3 allows the writing of two radar pixels and the fading of four video pixels each 1600 ns. Were it not for the nibble mode of operation described above, it would be necessary to either write only one radar pixel per 1600 ns (which results in a substantial loss of resolution), or to perform the fade in special cycles, e.g. during the vertical retrace time of the video display (which results in a visually unattractive display).

Figure 4:
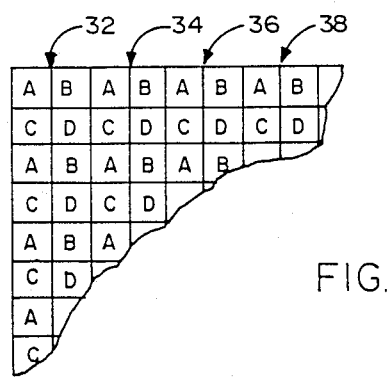
FIG. 4 is a graphical representation illustrating the inventive configuration of the scan converter memory.

In accordance with another aspect of the invention, an improved configuration of memory 20 allowing an improved operational cycle is shown in FIG. 4. In that configuration, a given address on chips A and B represents two adjacent pixels of one line of the video display 26, while the same address on chips C and D represents the corresponding pixels of the next line. Because of this difference in configuration, it is possible to write four radar pixels per 1600 ns without affecting read or fade.

Figure 5:
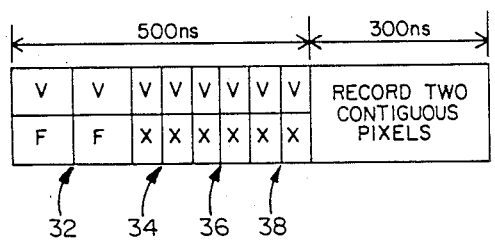
FIG. 5 is a graphical representation illustrating the inventive operational cycle used with the memory configuration of FIG. 4.

As shown in FIG. 5, the first 500 ns of the improved operational cycle are devoted to reading eight x-y pixels (the A and B pixels from four consecutive addresses 32, 34, 36, 38) into the buffer memory 22. During that 500 ns interval, a 300 ns segment can be used to perform two fades. The pixels to be faded in any given frame are the C and D pixels of one of the consecutive addresses 32 through 38. The first pixel to be faded is on the C chip at a location defined by the video read address 32 incremented by 0, 1, 2 and 3, respectively, in successive frames. The second pixel to be faded is on the D chip at the same address.

Consequently, a single address generation can be used to read eight consecutive pixels of one line into the buffer memory while simultaneously fading the first two corresponding pixels of the next line during a first frame, the next two during a second frame, the third two during a third frame, and the last two during a fourth frame.

The next 300 ns of the improved operational cycle of FIG. 5 are devoted to a simultaneous transfer of two adjacent radar pixels of the same azimuth in the buffer memory 16. This can be done in the improved configuration because (as an examination of FIG. 4 will show) two adjacent radar pixels of the same azimuth can never correspond to x-y pixels on the same chip, regardless of the direction of the radar vector.

During the next video field, the operation is reversed to read eight C and D pixels into the buffer memory 22 while fading two A and B pixels.

It will be seen that in both configurations of the x-y memory 20, sixteen x-y pixels are read into the buffer memory 22 every 1600 ns. This corresponds to an average read rate of ten pixels per microsecond, which is the same as the horizontal scan rate of a standard video display. In both configurations, x-y pixels are faded at the rate of 2.5 pixels per microsecond, or one full image fade every four frames.

When it comes to the recording of radar data in the x-y memory, however, the memory configuration of FIG. 2 with the operational cycle of FIG. 3 records radar data at the rate of two pixels every 1600 ns, or 1.25 pixels per microsecond. Yet even this rate can be achieved by conventional equipment only at the expense of intermittent fade with electronics of comparable quality, complexity and cost.

By contrast, radar data can be recorded in the x-y memory 20 at the rate of two pixels every 800 ns in the inventive configuration, which corresponds to 2.5 pixels per microsecond. The video display can therefore be updated twice as often for better resolution of fast-moving targets, with no additional memory chips being required.

Although the foregoing description has assumed the use of four parallel-readable memory chips A, B, C, D for each image plane, larger numbers of parallel-readable memory chips may be used when a higher resolution television format is required. This increases the number of pixels read out per operational cycle, and may result in more fades and/or polar coordinate writes per operational cycle. The principles of the invention, however, remain unchanged by such additions.

I claim:

1. A method of operating a polar format to video format scan converter so as to permit the writing of at least two polar-coordinate pixels in an x-y format, the fading of at least four pixels, and the reading of at least sixteen pixels into a video buffer during the time required for an operational cycle, comprising the steps of:
   (a) organizing the x-y memory of said scan converter in such a manner as to allow the parallel readout of at least four pixels;
   (b) reading four successive groups of at least four parallel pixels from a single address by using the nibble mode of reading said x-y memory;
   (c) fading at least four pixels in parallel; and
   (d) successively writing at least two polar coordinate pixels into said x-y memory at separately addressed locations.

2. A method of operating a polar format to video format scan converter so as to permit the writing of at least four polar-coordinate pixels in an x-y format, the fading of at least four pixels, and the reading of at least sixteen pixels into a video buffer during the time required for an operational cycle, comprising the steps of:
   (a) organizing the x-y memory of said scan converter in such a manner that sets of horizontally adjacent pixels and the corresponding pixels vertically adjacent thereto are stored on separate chips readable in parallel;
   (b) reading four successive groups of at least two of said parallel-readable pixels from a single address by using a fast mode of reading said x-y memory;
   (c) fading at least two parallel-readable pixels of one of said groups during the reading of said groups;
   (d) simultaneously writing at least two contiguous polar-coordinate pixels into said x-y memory immediately following said reading; and
   (e) repeating said reading, fading, and writing steps.

3. The method of claim 2, in which said fading step is performed on pixels of successively different ones of said groups in successive frames of the video scan.

4. In an x-y memory for polar format to video format scan converters having a linearly scanned display, where said memory is composed of a plurality of memory chips in which data can be simultaneously written or read, the improvement comprising: configuring said memory so that the same simultaneously addressed memory locations in said chips represent, respectively, adjacent pixels in one line of said display, and the horizontaly same pixels in at least one adjacent line of said display.

5. The improvement of claim 1, in which there are four memory chips, two of said chips representing groups of two adjacent pixels in odd-numbered lines, and the other two chips representing the same groups of two adjacent pixels in adjacent even-numbered lines.

* * * * *